(12) United States Patent
Li et al.

(10) Patent No.: US 9,898,827 B2
(45) Date of Patent: Feb. 20, 2018

(54) HIGH-SPEED AUTOMATIC MULTI-OBJECT TRACKING METHOD AND SYSTEM WITH KERNELIZED CORRELATION FILTERS

(71) Applicant: ZHEJIANG SHENGHUI LIGHTING CO., LTD, Jiaxing (CN)

(72) Inventors: Maolin Li, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 51 days.

(21) Appl. No.: 15/023,841

(22) PCT Filed: Jul. 28, 2015

(86) PCT No.: PCT/CN2015/085270
§ 371 (c)(1),
(2) Date: Mar. 22, 2016

(87) PCT Pub. No.: WO2016/026370
PCT Pub. Date: Feb. 25, 2016

(65) Prior Publication Data
US 2016/0239982 A1 Aug. 18, 2016

(30) Foreign Application Priority Data
Aug. 22, 2014 (CN) .......................... 2014 1 0418797

(51) Int. Cl.
*G06T 7/20* (2017.01)
*G06K 9/66* (2006.01)
(Continued)

(52) U.S. Cl.
CPC ............ *G06T 7/20* (2013.01); *G06K 9/00711* (2013.01); *G06K 9/00718* (2013.01);
(Continued)

(58) Field of Classification Search
CPC ....... G06T 7/20; G06T 7/2006; G06T 7/2066; G06T 7/208; G06T 7/2093; G06T 7/248;
(Continued)

(56) References Cited

U.S. PATENT DOCUMENTS 5,384,867 A * 1/1995 Barnsley ................. G06T 9/001
375/E7.204
5,875,108 A * 2/1999 Hoffberg ................... G06F 3/00
382/181
(Continued)

FOREIGN PATENT DOCUMENTS

| CN | 102074034 A | 5/2011 |
|---|---|---|
| CN | 103237197 A | 8/2013 |
| CN | 104200237 A | 12/2014 |

OTHER PUBLICATIONS

The World Intellectual Property Organization (WIPO) International Search Report for PCT/CN2015/085270 Nov. 2, 2015.

*Primary Examiner* — Manav Seth
(74) *Attorney, Agent, or Firm* — Anova Law Group, PLLC

(57) ABSTRACT

A high-speed automatic multi-object tracking method with kernelized correlation filters is provided. The method includes obtaining an image frame from a plurality of image frames in a video, extracting a foreground object sequence from the obtained image frame, and determining similarity between each foreground object of the extracted foreground object sequence and a tracked object. The method also includes calculating HOG features of the foreground objects with a lower similarity, obtaining training samples for each of the foreground objects with the lower similarity using a circular matrix, obtaining a classifier via a kernel method accelerated by FFTW, and obtaining tracking points using a sparse optical flow. Further, the method includes detecting object matching responses using a detection response func-
(Continued)

tion, performing multi-scale analysis for the object based on an optical flow method, and processing a next image frame of the plurality of image frames in the video until the video ends.

10 Claims, 3 Drawing Sheets

(51) Int. Cl.
    *G06K 9/00*     (2006.01)
    *G06K 9/62*     (2006.01)
    *G06T 7/246*     (2017.01)

(52) U.S. Cl.
    CPC ....... *G06K 9/00765* (2013.01); *G06K 9/6256* (2013.01); *G06K 9/6269* (2013.01); *G06K 9/66* (2013.01); *G06T 7/248* (2017.01); *G06T 2207/10016* (2013.01); *G06T 2207/20081* (2013.01); *G06T 2207/30232* (2013.01); *G06T 2207/30241* (2013.01)

(58) Field of Classification Search
    CPC . G06T 2207/10016; G06T 2207/20081; G06T 2207/30232; G06T 2207/30241; G06K 2209/21; G06K 9/00711; G06K 9/00718; G06K 9/00765; G06K 9/6256; G06K 9/6269; G06K 9/66; G06K 2209/23; G08B 13/19602; G08B 13/19608; G08B 13/1961; H04N 5/144

See application file for complete search history.

(56) References Cited

U.S. PATENT DOCUMENTS

| | | | | |
|---|---|---|---|---|
| 7,403,643 B2* | 7/2008 | Ianculescu | ......... | G06K 9/00228 382/118 |
| 8,050,465 B2* | 11/2011 | Ianculescu | ......... | G06K 9/00228 382/118 |
| 8,422,739 B2* | 4/2013 | Ianculescu | ......... | G06K 9/00228 348/222.1 |
| 8,543,525 B2* | 9/2013 | Distante | ............. | A63B 71/0605 382/107 |
| 8,648,959 B2* | 2/2014 | Capata | ............... | G06K 9/00255 348/169 |
| 8,659,697 B2* | 2/2014 | Capata | ............... | G06K 9/00228 348/169 |
| 8,687,078 B2* | 4/2014 | Bigioi | ................ | G06K 9/00228 348/222.1 |
| 8,873,813 B2* | 10/2014 | Tadayon | ................ | G06K 9/00 382/118 |
| 9,036,902 B2* | 5/2015 | Nathan | ............... | G06K 9/00771 382/159 |
| 9,661,215 B2* | 5/2017 | Sivan | ................ | H04N 5/23219 |
| 2006/0008152 A1* | 1/2006 | Kumar | .................... | H04N 5/85 382/190 |
| 2012/0237082 A1* | 9/2012 | Sengupta | .......... | G06K 9/00771 382/103 |

\* cited by examiner

HIGH-SPEED AUTOMATIC MULTI-OBJECT TRACKING METHOD AND SYSTEM WITH KERNELIZED CORRELATION FILTERS

CROSS-REFERENCES TO RELATED APPLICATIONS

This application is a national stage application under 35 USC § 371(c) of PCT Application No. PCT/CN2015/085270, entitled "HIGH-SPEED AUTOMATIC MULTI-OBJECT TRACKING METHOD AND SYSTEM WITH KERNELIZED CORRELATION FILTERS," filed on Jul. 28, 2015, which claims priority to Chinese Patent Application No. 201410418797.7, filed on Aug. 22, 2014. The entire disclosure and contents of the above applications are hereby incorporated by reference herein.

FIELD OF THE INVENTION

The present invention generally relates to the field of computer vision technologies and, more particularly, to high-speed automatic multi-object tracking methods and systems with kernelized correlation filters.

BACKGROUND

Object tracking is an important research domain in computer vision. Object tracking is the basis for detailed analysis of an object. Based on the object tracking, object trajectory and behavioral analysis can be implemented. Currently, there are two types of object tracking models in the academic field: a recognition-based tracker and a generation-based tracker.

In general, a recognition-based tracker is better than a generation-based tracker. Online machine learning is generally required for the recognition-based tracker. Further, a classifier generated through online machine learning is used to identify objects.

In general, recognition-based tracking algorithms can adapt to object change in a certain extent and are robust. But the recognition-based tracking algorithms require a large number of training samples and the training process is very time-consuming. It is difficult for the recognition-based tracking algorithms to solve multi-scale problems. Therefore, to overcome disadvantages of the recognition-based tracking algorithms, a circulant matrix method can be used to obtain the training samples. On one hand, sufficient number of training samples can be obtained to train a classifier with a higher recognition rate; on the other hand, according to characteristics of the circulant matrix, Fourier transform and kernel trick are used to reduce the time required for training the classifier. Thus, the method can resolve the problem of training sample and reduce training time. However, the method cannot solve the multi-scale problems and cannot accelerate Fourier transform. In addition, the method cannot be extended to multi-object tracking scenarios.

The disclosed methods and systems are directed to solve one or more problems set forth above and other problems. For example, the high-speed automatic multi-object tracking method with kernelized correlation filters can be applied in battlefield surveillance, video monitoring, image compression, image retrieve, human-computer interaction, and so on.

BRIEF SUMMARY OF THE DISCLOSURE

One aspect of the present disclosure includes a high-speed automatic multi-object tracking method with kernelized correlation filters. The method includes obtaining an image frame from a plurality of image frames in a video, extracting a foreground object sequence from the obtained image frame, and determining similarity between each foreground object of the extracted foreground object sequence and a tracked object. The method also includes calculating Histogram of Oriented Gradients (HOG) features of the foreground objects with a lower similarity, obtaining training samples for each of the foreground objects with the lower similarity using a circular matrix, training a classifier via a kernel method accelerated by faster Fourier transform in the west (FFTW), and obtaining tracking points using a sparse optical flow. Further, the method includes detecting object matching responses using a detection response function, performing multi-scale analysis for the object based on an optical flow method, and processing a next image frame of the plurality of image frames in the video until the video ends.

Another aspect of the present disclosure includes a high-speed automatic multi-object tracking system with kernelized correlation filters. The system includes a video capture module configured to capture a video, an obtaining module configured to obtain an image frame from a plurality of image frames in the video captured by the video capture module, and an extraction module configured to extract a foreground object sequence from the obtained image frame. The system also includes an image analyzer configured to determine similarity between each foreground object of the extracted foreground object sequence and a tracked object, obtain training samples for each of the foreground objects with the lower similarity using a circular matrix, train a classifier via a kernel method accelerated by faster Fourier transform in the west (FFTW), and obtain tracking points using a sparse optical flow. Further, the system includes a detection module configured to detect object matching responses using a detection response function and perform multi-scale analysis for the object based on an optical flow method, where a location with a maximum response is a new location of the object.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
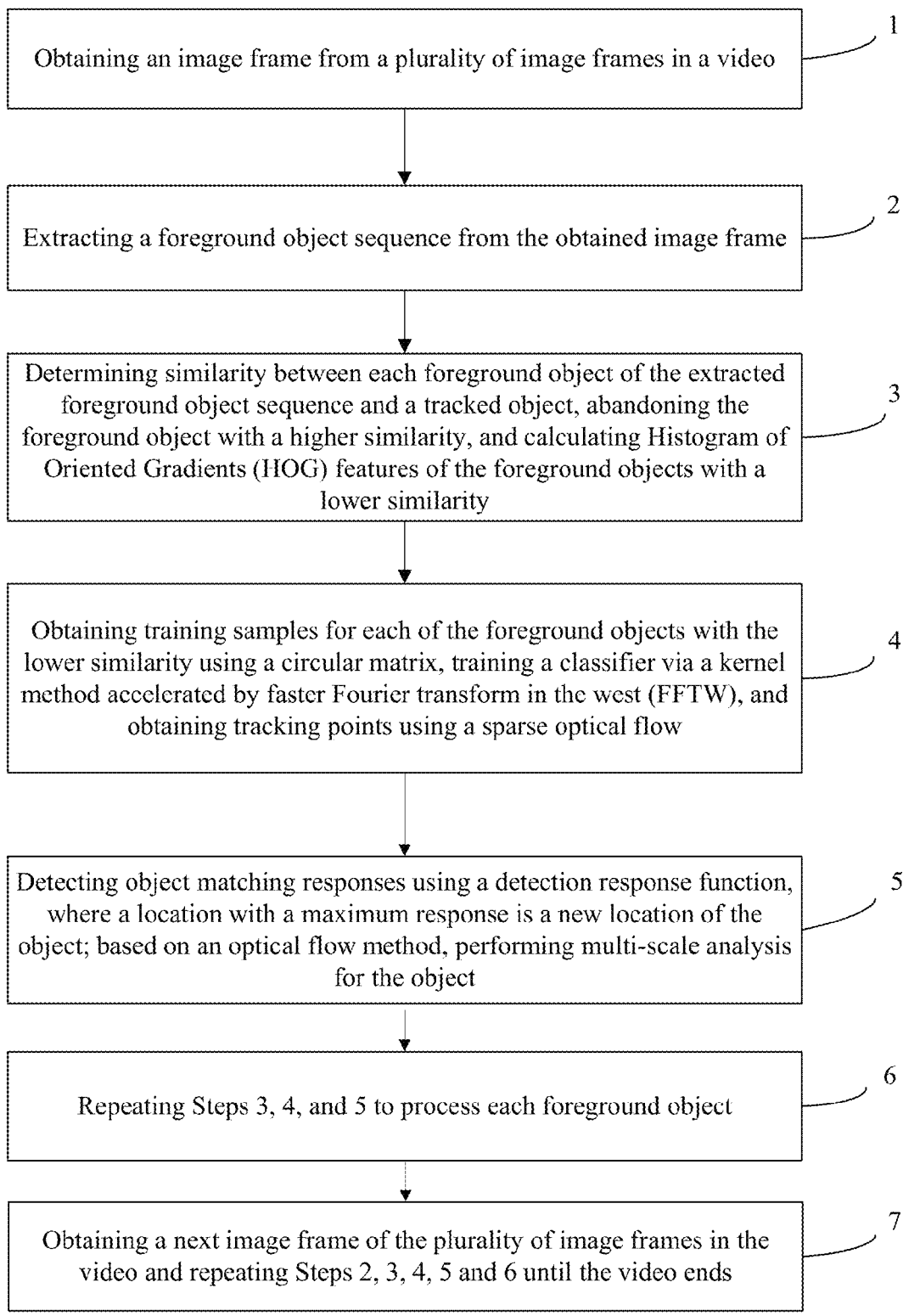
FIG. 1 illustrates a flow chart of an exemplary high-speed automatic multi-object tracking process with kernelized correlation filters consistent with the disclosed embodiments.

Reference will now be made in detail to exemplary embodiments of the invention, which are illustrated in the accompanying drawings. Wherever possible, the same reference numbers will be used throughout the drawings to refer to the same or like parts.

The term "ridge regression" is a biased estimation regression method for collinear data analysis. In fact, ridge regression is a simple variant of ordinary least square method. Ridge regression discards the unbiasedness feature of the least square method. By losing some information and reducing accuracy, a regression method, which has more practical, and more reliable regression coefficients can be obtained. For tolerance of morbidity data, ridge regression is far stronger than the least squares method.

The term "circulant matrix" is a special kind of Toeplitz matrix, where each row vector is rotated one element to the right relative to the preceding row vector. In numerical analysis, circulant matrices are important because they are diagonalized by a discrete Fourier transform, and hence linear equations that contain them may be quickly solved using a faster Fourier transform.

The term "optical flow or optic flow" is the pattern of apparent motion of objects, surfaces, and edges in a visual scene caused by the relative motion between an observer (an eye or a camera) and the scene. Optical flow has been commonly described as the apparent motion of brightness patterns in an image sequence. That is, optical flow is the projection of a 3-D motion vector of objects onto the 2-D image plane.

Kernel methods owe the name to the use of kernel functions, which enable them to operate in a high-dimensional, implicit feature space without ever computing the coordinates of the data in that space, but rather by simply computing the inner products between the images of all pairs of data in the feature space. The kernel function may be defined by:

$$K(x1, x2) = <\phi(x1), \phi(x2)>,$$

where x1 and x2 are points (scalars or vectors) in a high-dimensional space; \phi(xi) represents a point converted from a low-dimensional space to in high-dimensional space; <,> represents an inner product of vectors.

In machine learning, classification (or regression) problems can be divided into two categories: a parameter learning and an instance-based learning. The parameter learning is implemented through a lot of training data. The parameters of the corresponding model can be obtained by learning through the training data and then the training data is no useful. For new data, appropriate conclusions can be obtained using the parameters obtained by learning. The instance-based learning (also called memory-based learning) is a family of learning algorithms that, instead of performing explicit generalization, compares new problem instances with instances seen in training, which have been stored in memory. Examples of instance-based learning algorithm are the k-nearest neighbor (kNN) algorithm, kernel machines and RBF networks. The instance-based learning stores training sets; when predicting a value/class for a new instance, the instance-based learning computes distances or similarities between this instance and the training instances to make a decision. The similarities between this instance and the training instances may be represented by an inner product of vectors. Therefore, the kernel methods only aim at the instance-based learning.

For the recognition-based tracking algorithms, obtaining a large number of samples is very important, because a classifier trained by a large number of samples has a higher recognition rate. However, it is time-consuming to train the classifier using a large number of samples. So it is very difficult to meet real-time requirements. The common strategy is to randomly select some samples to train the classifier. Although such a strategy makes some sense, the recognition rate of the classifier may be reduced and the tracking performance is decreased.

Therefore, the high-speed automatic multi-object tracking method with kernel-based collaborative filtering obtains a large number of samples by using a circulant matrix. The time consumption of the method is very low, achieving real-time requirements.

The high-speed automatic multi-object tracking method with kernel-based collaborative filtering includes a learning phase and a detection phase.

In the learning phase, a ridge regression algorithm is used. The goal of training is to find a function (that is, a classifier) $f(z) = w^T z$ that minimizes the squared error over samples $x_i$ and the regression object $y_i$, $$\min_w \sum_i (f(x_i) - y_i)^2 + \lambda \|w\|^2 \quad (1)$$

The $\lambda$ is a regularization parameter that controls overfitting. The goal of training is to determine the parameter w. Based on Equation (1), the parameter w is represented by:

$$w = (X^T X + \lambda I)^{-1} X^T y \quad (2)$$

where X is a matrix of sample data; the data matrix X has one sample per row $x_i$, and each element of vector y is a regression target $y_i$; I is an identity matrix; and T is a transpose of the matrix.

In the Fourier domain, quantities are usually complex valued. The complex version of Equation (2) is represents by:

$$w^* = (X^H X + \lambda I)^{-1} X^H y \quad (3)$$

where * represents complex conjugates; $X^H$ is the Hermitian transpose, i.e., $X^H = (X^*)^T$, and $X^*$ is the complex-conjugate of X. If X is a real number, Equation (3) reduces to Equation (2).

In general, a large system of linear equations must be solved to compute the solution, which can become prohibitive in a real-time setting. A circulant matrix and a kernel trick are used to bypass this limitation.

Then, the matrix of sample data X is reconstructed by a specific circulant matrix (i.e., permutation matrix) P. Specifically, a base sample is an n×1 vector representing a patch with the object of interest, denoted x. The goal is to train a classifier with both the base sample (a positive example) and several virtual samples obtained by translating it (which serve as negative examples). One-dimensional translations of this vector can be modeled by a cyclic shift operator, which is the permutation matrix:

$$P = \begin{bmatrix} 0 & 0 & \cdots & 0 & 1 \\ 1 & 0 & \cdots & 0 & 0 \\ 0 & \ddots & \ddots & \vdots & \vdots \\ \vdots & \ddots & \ddots & 0 & 0 \\ 0 & \cdots & 0 & 1 & 0 \end{bmatrix}. \quad (4)$$

The product $P_x = [x_n, x_1, x_2, \ldots, x_{n-1}]^T$ shifts x by one element, modeling a small translation. It can chain u shifts to achieve a larger translation by using the matrix power $P^u x$. A negative u can shift in the reverse direction. $P^u x$ represents that a sample is shifted for the number of u times. For a given sample X, sample data matrix I is obtained through the circulant matrix p transform. Due to the property of the circulant matrix, the sample data matrix I is also a circulant matrix and all circulant matrices are made diagonal by Discrete Fourier Transform (DFT), regardless of the generating vector x. This can be expressed as:

$$X = F^H \text{diag}(\hat{x}) F \quad (5)$$

where F is a constant matrix that does not depend on x, and $\hat{x}$ denotes the DFT of the generating vector, $\hat{x} = F(x)$.

Here, a hat ^ can be used as shorthand for the DFT of a vector. The constant matrix F is known as the DFT matrix, and is the unique matrix that computes the DFT of any input vector. This is possible because the DFT is a linear operation. Equation (5) expresses the eigendecomposition of a general circulant matrix. The shared, deterministic eigenvectors F lie at the root of many uncommon features, such as commutativity or closed-form inversion.

Equation (5) is applied to the full expression for linear regression (i.e., Equation (3)). Most quantities can be put inside the diagonal. Equation (3) can be written as:

$$\hat{w}^* = \frac{\hat{x}^* \odot \hat{y}}{\hat{x}^* \odot \hat{x} + \lambda} \quad (6)$$

where $\hat{x}$ and $\hat{y}$ represent the DFT of vectors x and y, respectively. In Equation (3), the fraction denotes element-wise division.

The Correlation filters and the kernel trick are further introduced to accelerate solving Equation (6). In the kernel trick, the solutions w can be written as a linear combination of the samples. That is, $$w = \sum_i \alpha_i \varphi(x_i) \quad (7)$$

The variables under optimization are thus α, instead of w. Further, The solution to the kernelized version of Ridge Regression is given by:

$$\alpha = (K + \lambda I)^{-1} y \quad (8)$$

where K is the kernel matrix and α is the vector of coefficients $\alpha_i$, that represent the solution in the dual space. By proof of theorem, when the selected kernel is Radial Basis Function kernels (e.g., Gaussian) or dot-product kernels (e.g., linear, polynomial), K is the circulant matrix.

$$\hat{\alpha}^* = \frac{\hat{y}}{\hat{k}^{xx} + \lambda} \quad (9)$$

where $\hat{k}^{xx}$ is the first row of the kernel matrix $K = C(k^{xx})$, and again a hat ^ denotes the DFT of a vector.

In the detection phrase, to detect the object of interest, the function (that is, a classifier) f(z) is evaluated on several image locations, i.e., for several candidate patches. These patches can be modeled by cyclic shifts. $K^z$ is a (asymmetric) kernel matrix between all training samples and all candidate patches. $f(z) = (K^z)^T \alpha$ is a vector, containing the output for all cyclic shifts of z, i.e., the full detection response. f(z) can be diagonalized to obtain a detection response function. The detection response function is represented by:

$$\hat{f}(z) = (\hat{k}^{xz})^* \odot \hat{\alpha} \quad (10)$$

where Z is a candidate position vector of the object, α is the vector of coefficients $\alpha_i$; and $K^{xz}$ is the kernel correlation of X and Z.

FIG. 1 illustrates a flow chart of an exemplary high-speed automatic multi-object tracking process with kernelized correlation filters consistent with the disclosed embodiments. As shown in FIG. 1, the high-speed automatic multi-object tracking process with kernelized correlation filters may include the following steps.

Step 1: an image frame is obtained from a plurality of image frames in a video.

Because a video is a sequence of frames and changes between consecutive frames are relatively small due to the typical frame rate for a video (e.g. 25 frames/second), instead of dealing with each frame individually, some grouping or clustering techniques may be applied to separate the whole video into different sets of frames with each set has similar frames for further processing.

Figure 3:
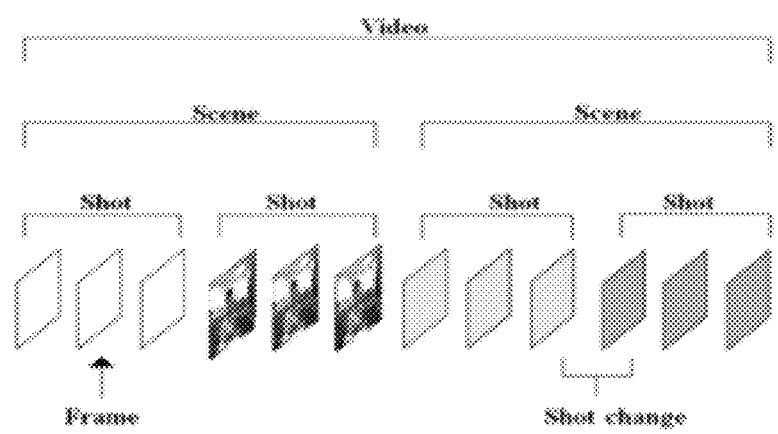
FIG. 3 illustrates a video stream being divided into different video components.

For example, FIG. 3 illustrates a video stream being divided into different video components. As show in FIG. 3, a video stream may be divided into scenes, a scene may be divided into shots, and a shot may be divided into frames, etc. The frame can be further divided into objects and features of the video frame may be extracted for further processing.

Returning to FIG. 1, after the image frame is obtained, the process goes to Step 2.

Step 2: Based on a Gaussian mixture background modeling algorithm, a foreground object sequence is extracted from the image frame.

The Gaussian Mixture background modeling algorithm is used as a statistical model of the background pixel color generation process. Effectively, the mixture is used as a multi-modal probability density function predicting the probability of occurrence of a pixel value as part of the background scene.

Step 3: similarity between each foreground object of the extracted foreground object sequence and a tracked object is determined, where all foreground objects with a higher similarity are abandoned, and only Histogram of Oriented Gradients (HOG) features of the foreground objects with a lower similarity are calculated. If the similarity between the foreground object and the tracked object is high, it indicates that the foreground object with the higher similarity is tracked. Therefore, the foreground objects with the higher similarity do not need to be tracked again.

HOG are feature descriptors used in computer vision and image processing for the purpose of object detection. The technique counts occurrences of gradient orientation in localized portions of an image.

Step 4: for each of the foreground objects with the lower similarity in Step 3, training samples are obtained using a circular matrix; through a ridge regression plan, a classifier is obtained using a formula $$\hat{\alpha}^* = \frac{\hat{y}}{\hat{k}^{xx} + \lambda}$$

via a kernel method accelerated by faster Fourier transform in the west (FFTW); and tracking points are obtained using a sparse optical flow.

In the formula $$\hat{\alpha}^* = \frac{\hat{y}}{\hat{k}^{xx} + \lambda},$$

K is a kernel matrix and α is the vector of coefficients $α_i$. $\hat{k}^{xx}$ is the first row of the kernel matrix K=C ($k^{xx}$), and a hat ^ denotes the DFT of a vector.

Step 5: object matching responses are detected using a detection response function $\hat{f}(z)=(\hat{k}^{xz})^*\odot\hat{α}$. A location with a maximum response is a new location of the object; and based on an optical flow method, multi-scale analysis for the object is performed.

$f(z)=(K^z)^T α$ is a vector, containing the output for all cyclic shifts of z, i.e., the full detection response. $f(z)$ can be diagonalized to obtain the detection response function. In the detection response function $\hat{f}(z)=(\hat{k}^{xz})^*\odot\hat{α}$, where Z is a candidate position vector of the object, and $K^{xz}$ is the kernel correlation of X and Z.

Step 6: Steps 3, 4, 5 are repeated to process each foreground object.

Step 7: a next image frame is obtained from the plurality of image frames in the video and Steps 2, 3, 4, 5 and 6 are repeated until the video ends. Finally, the system outputs the results of the object detection.

Figure 2:
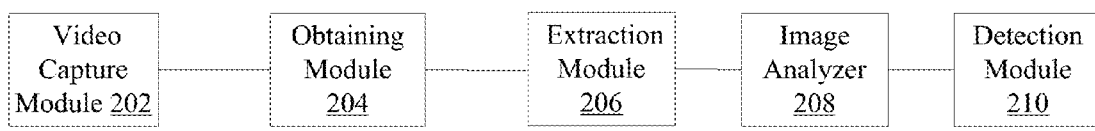
FIG. 2 illustrates a schematic diagram of an exemplary high-speed automatic multi-object tracking system with kernelized correlation filters consistent with the disclosed embodiments.

FIG. 2 illustrates a schematic diagram of an exemplary high-speed automatic multi-object tracking system with kernelized correlation filters consistent with the disclosed embodiments. As shown in FIG. 2, the high-speed automatic multi-object tracking system with kernelized correlation filters 200 may include a video capture module 202, an obtaining module 204, an extraction module 206, an image analyzer 208, and a detection module 210. Certain modules may be omitted and other modules may be included.

The video capture module 202 may be configured to capture a video. The obtaining module 204 may be configured to obtain an image frame from a plurality of image frames in the video captured by the video capture module 202.

The extraction module 206 may be configured to extract a foreground object sequence from the obtained image frame.

The image analyzer 208 may be configured to determine similarity between each foreground object of the extracted foreground object sequence and a tracked object, wherein all foreground objects with a higher similarity are abandoned, and only Histogram of Oriented Gradients (HOG) features of the foreground objects with a lower similarity are calculated.

Further, the image analyzer 208 may be configured to obtain training samples for each of the foreground objects with the lower similarity using a circular matrix, train a classifier via a kernel method accelerated by faster Fourier transform in the west (FFTW), and obtain tracking points using a sparse optical flow. The image analyzer 208 may obtain the classifier using a formula $$\hat{α}^* = \frac{\hat{y}}{\hat{k}^{xx}+λ}$$

via the kernel method accelerated by the FFTW, where K is a kernel matrix; α is the vector of coefficients αi; λ is a regularization parameter that controls overfitting; $\hat{k}^{xx}$ is a first row of the kernel matrix K=C ($k^{xx}$); and a hat ^ denotes Discrete Fourier Transform (DFT) of a vector.

The detection module 210 may be configured to detect object matching responses using a detection response function and perform multi-scale analysis for the object based on an optical flow method, wherein a location with a maximum response is a new location of the object.

It is assumed that X is a matrix of sample data; the data matrix X has one sample per row xi, and each element of vector y is a regression target yi, the detection response function is represented by:

$$\hat{f}(z)=(\hat{k}^{xz})^*\odot\hat{α} \qquad (10)$$

where Z is a candidate position vector of the object; α is a vector of coefficients $α_i$; and $K^{xz}$ is kernel correlation of X and Z.

Figure 4:
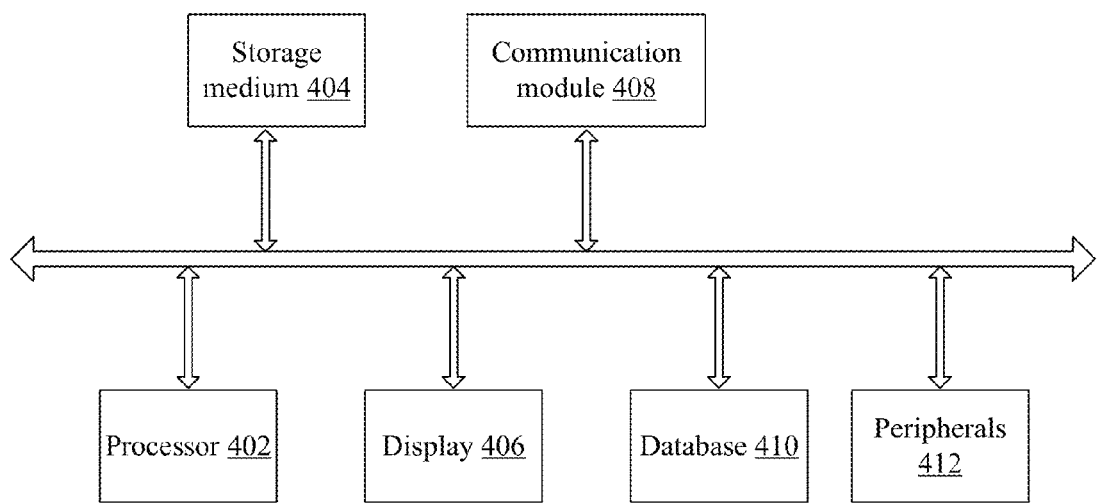
FIG. 4 illustrates an exemplary computing system consistent with the disclosed embodiments.

FIG. 4 illustrates an exemplary computing system consistent with the disclosed embodiments. As shown in FIG. 4, computing system 400 may include a processor 402, a storage medium 404, a display 406, a communication module 408, a database 410, and peripherals 412. Certain devices may be omitted and other devices may be included.

Processor 402 may include any appropriate processor or processors. Further, processor 402 can include multiple cores for multi-thread or parallel processing. Storage medium 404 may include memory modules, such as ROM, RAM, flash memory modules, and mass storages, such as CD-ROM and hard disk, etc. Storage medium 404 may store computer programs for implementing various processes when the computer programs are executed by processor 402.

Further, peripherals 412 may include various sensors and other I/O devices, such as keyboard and mouse, and communication module 408 may include certain network interface devices for establishing connections through communication networks. Database 410 may include one or more databases for storing certain data and for performing certain operations on the stored data, such as database searching.

Further, although the methods and systems are disclosed for illustrative purposes, similar concept and approach can be applied to other object tracking system. For example, a high-speed automatic multi-object tracking method with kernelized correlation filters can be applied in battlefield surveillance, video monitoring, image compression, image retrieve, human-computer interaction, and so on. Other applications, advantages, alternations, modifications, or equivalents to the disclosed embodiments are obvious to those skilled in the art.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Embodiments consistent with the present disclosure may be implemented with a video camera control system to track multi-objects. The control system for the video camera may perform certain camera functions, such as zooming, rescaling, target recognition, based on the output of the object tracking system in real time. For example, if the object tracking system detects the new location of the tracked object, the camera system may re-apply the zoom based on the newly determined location of the object. If the object tracking system detects the new locations of a plurality of tracked objects, the camera system may re-apply the zoom based on the newly determined locations of the objects.

Embodiments consistent with the present disclosure may be implemented with a video camera control system to track multi-objects. The video camera system may be integrated with an LED (light emitting diode) lighting system. The control system for the video camera/LED lighting system may perform certain lighting related functions, such as adjusting lighting on the object for the camera, based on the output of the object tracking system in real time. For example, if the object tracking system detects the new location of the tracked object, the camera system may adjust the lighting, such as re-orient the LED lighting device or adjust the brightness of certain area lit, based on the newly determined location of the object. If the object tracking system detects the new location of a plurality of tracked objects, the camera system may adjust the lighting, such as re-orient the LED lighting device or adjust the brightness of certain area lit, based on the newly determined locations of the objects.

Compared to existing technologies, a high-speed automatic multi-object tracking method with kernelized correlation filters can extract a foreground object sequence from an image frame based on a Gaussian mixture background modeling algorithm and can be extended to multi-object tracking scenarios. The method can obtain sufficient number of training samples for each of foreground objects using a circular matrix and train a classifier via a kernel method accelerated by faster Fourier transform in the west (FFTW), reducing the time required for training the classifier. At the same time, the method can solve the multi-scale problems.

What is claimed is:

1. A high-speed automatic multi-object tracking method with kernelized correlation filters implemented by an object tracking system, comprising:
   obtaining an image frame from a plurality of image frames in a video;
   extracting a foreground object sequence from the obtained image frame;
   determining similarity between each foreground object of the extracted foreground object sequence and a tracked object;
   calculating Histogram of Oriented Gradients (HOG) features of the foreground objects with a lower similarity;
   obtaining training samples for each of the foreground objects with the lower similarity using a circular matrix;
   training a classifier via a kernel method accelerated by faster Fourier transform in the west (FFTW);
   obtaining tracking points using a sparse optical flow;
   detecting object matching responses using a detection response function, wherein a location with a maximum response is a new location of the object;
   performing multi-scale analysis for the object based on an optical flow method; and
   processing a next image frame of the plurality of image frames in the video until the video ends.

2. The method according to claim 1, wherein extracting a foreground object sequence from the obtained image frame further includes:
   based on a Gaussian mixture background modeling algorithm, extracting the foreground object sequence from the obtained image frame.

3. The method according to claim 1, wherein:
   all foreground objects with a higher similarity are abandoned, and only Histogram of Oriented Gradients (HOG) features of the foreground objects with the lower similarity are calculated.

4. The method according to claim 1, wherein obtaining a classifier via a kernel method accelerated by FFTW further includes:
   obtaining the classifier using $$\hat{\alpha}^* = \frac{\hat{y}}{\hat{k}^{xx} + \lambda}$$

via the kernel method accelerated by the FFTW, wherein K is a kernel matrix; α is the vector of coefficients $\alpha_i$; λ is a regularization parameter that controls overfitting; $\hat{k}^{xx}$ is a first row of the kernel matrix $K=C(k^{xx})$; and a hat ^ denotes Discrete Fourier Transform (DFT) of a vector.

5. The method according to claim 2, wherein:
   provided that X is a matrix of sample data; the matrix X has one sample per row $x_i$, and each element of vector y is a regression target $y_i$, the detection response function is represented by:
   $$\hat{f}(z) = (\hat{k}^{xz})^* \odot \hat{\alpha}$$
   wherein Z is a candidate position vector of the object; α is a vector of coefficients $\alpha_i$; and $K^{xz}$ is kernel correlation of X and Z.

6. A high-speed automatic multi-object tracking system with kernelized correlation fitters, comprising:
   a processor; and
   a storage medium configured to store a computer program executed by the processor to cause the processor to:
   capture a video;
   obtain an image frame from a plurality of image frames in the captured video;
   extract a foreground object sequence from the obtained image frame;
   determine similarity between each foreground object of the extracted foreground object sequence and a tracked object;
   obtain training samples for each of the foreground objects with the lower similarity using a circular matrix;
   train a classifier via a kernel method accelerated by faster Fourier transform in the west (FFTW);
   obtain tracking points using a sparse optical flow; and
   detect object matching responses using a detection response function and perform multi-scale analysis for the object based on an optical flow method, wherein: a location with a maximum response is a new location of the object.

7. The system according to claim 6, wherein the processor is further configured to:
   extract the foreground object sequence from the obtained image frame based on a Gaussian mixture background modeling algorithm.

8. The system according to claim 6, wherein:
   all foreground objects with a higher similarity are abandoned, and only Histogram of Oriented Gradients (HOG) features of the foreground objects with the lower similarity are calculated.

9. The system according to claim 6, wherein the processor is further configured to:
   obtain the classifier using $$\hat{\alpha}^* = \frac{\hat{y}}{\hat{k}^{xx} + \lambda}$$

via the kernel method accelerated by the FFTW, wherein K is a kernel matrix; $\alpha$ is the vector of coefficients $\alpha_i$; $\lambda$ is a regularization parameter that controls overfitting; $\hat{k}^{xx}$ is a first row of the kernel matrix $K=C(k^{xx})$; and a hat denotes Discrete Fourier Transform (DFT) of a vector.

10. The system according to claim 6, wherein:
provided that X is a matrix of sample data, the matrix X has one sample per row $x_i$, and each element of vector y is a regression target $y_i$, the detection response function is represented by:

$$\hat{f}(z) = (\hat{k}^{xz})^* \odot \hat{\alpha}$$

wherein Z is a candidate position vector of the object; $\alpha$ is a vector of coefficients $\alpha_i$; and $K^{xz}$ is kernel correlation of X and Z.

* * * * *